(12) United States Patent
Abolhassani et al.

(10) Patent No.: US 7,821,217 B2
(45) Date of Patent: Oct. 26, 2010

(54) ELECTRONICALLY COMMUTATED MOTOR AND CONTROL SYSTEM EMPLOYING PHASE ANGLE CONTROL OF PHASE CURRENT

(75) Inventors: Mehdi Abolhassani, Timonium, MD (US); Shailesh P. Waikar, Cockeysville, MD (US); Ren H. Wang, Timonium, MD (US); Uday S. Deshpande, San Diego, CA (US)

(73) Assignee: Black & Decker Inc., Newark, DE (US)

( * ) Notice: Subject to any disclaimer, the term of this patent is extended or adjusted under 35 U.S.C. 154(b) by 343 days.

(21) Appl. No.: 11/751,790

(22) Filed: May 22, 2007

(65) Prior Publication Data
US 2007/0267990 A1 Nov. 22, 2007

Related U.S. Application Data

(60) Provisional application No. 60/802,460, filed on May 22, 2006.

(51) Int. Cl.
H02P 7/00 (2006.01)
(52) U.S. Cl. .................. 318/432; 318/430; 318/437; 318/400.01; 318/799; 318/809; 173/141; 173/161; 173/176
(58) Field of Classification Search .................. 310/181, 310/191; 173/93.5, 97, 4, 141, 161, 166, 173/176, 217; 318/11, 55, 114, 257, 595, 318/400.07, 400.34, 432, 715, 779, 362, 318/400.01, 400.12, 430, 434, 437, 700, 318/714, 717, 799, 809, 569, 572; 363/149; 82/1.2, 72, 79, 118; 30/500
See application file for complete search history.

(56) References Cited

U.S. PATENT DOCUMENTS 4,213,356 A * 7/1980 Armitage ..................... 82/118

(Continued)

FOREIGN PATENT DOCUMENTS

EP 1085644 A 8/2000

(Continued)

OTHER PUBLICATIONS

Stephen J. Chapman, Electric Machinery Fundamentals, 1991, 1985, Mc-Graw-Hill, Inc, 2nd edition, pp. 661-663 & 697.*

Primary Examiner—Walter Benson
Assistant Examiner—Antony M Paul
(74) Attorney, Agent, or Firm—Harness, Dickey & Pierce, P.L.C.

(57) ABSTRACT

A power tool may include an electronically commutated motor such as, for example, a brushless DC permanent magnet motor with a rotor having internally mounted magnets and/or cavities filled with air or other non-magnetic materials. A control system may be used to control the motor in a manner that implements field weakening when the speed of the motor increases beyond its rated motor speed, or when the torque demands on the motor continue to increase after the maximum power output of the motor is reached. The field weakening may offset the growing back EMF and may enable a constant power and constant efficiency to be achieved by the motor over a wide speed range, rather than at just a single predetermined operating speed. Pulse width modulation control of the motor may be used up until the motor reaches its maximum power output.

22 Claims, 8 Drawing Sheets

U.S. PATENT DOCUMENTS

| | | | |
|---|---|---|---|
| 4,950,960 A * | 8/1990 | Krefta et al. | 318/400.2 |
| 5,177,391 A | 1/1993 | Kusase | |
| 5,304,882 A | 4/1994 | Lipo et al. | |
| 5,387,061 A | 2/1995 | Barkman et al. | |
| 5,433,007 A * | 7/1995 | Clark et al. | 30/360 |
| 5,455,473 A * | 10/1995 | Lipo et al. | 310/114 |
| 5,463,299 A * | 10/1995 | Futami et al. | 318/618 |
| 5,562,528 A | 10/1996 | Ueyama et al. | |
| 5,631,512 A * | 5/1997 | Kawabata et al. | 310/156.15 |
| 5,637,968 A | 6/1997 | Kainec et al. | |
| 5,804,939 A * | 9/1998 | Yamai et al. | 318/400.01 |
| 5,821,710 A | 10/1998 | Masuzawa et al. | |
| 5,825,112 A * | 10/1998 | Lipo et al. | 310/181 |
| 6,002,234 A * | 12/1999 | Ohm et al. | 318/729 |
| 6,034,458 A * | 3/2000 | Uetake et al. | 310/156.49 |
| 6,194,852 B1 * | 2/2001 | Lovatt et al. | 318/400.14 |
| 6,320,350 B1 * | 11/2001 | Take | 318/811 |
| 6,373,211 B1 * | 4/2002 | Henry et al. | 318/432 |
| 6,508,614 B1 | 1/2003 | Ozaki et al. | |
| 6,541,877 B2 | 4/2003 | Kim et al. | |
| 6,605,912 B1 * | 8/2003 | Bharadwaj et al. | 318/400.09 |
| 6,841,911 B2 * | 1/2005 | Kim et al. | 310/114 |
| 6,897,590 B2 | 5/2005 | Popov | |
| 6,927,519 B2 | 8/2005 | Popov | |
| 6,967,424 B2 | 11/2005 | Popov | |
| 6,987,342 B2 | 1/2006 | Hans | |
| 7,064,513 B2 * | 6/2006 | Fenley | 318/700 |
| 7,170,243 B2 * | 1/2007 | Nakagawa et al. | 318/400.09 |
| 7,193,378 B1 * | 3/2007 | Welchko | 318/400.27 |
| 7,194,321 B2 * | 3/2007 | Sun et al. | 318/400.01 |
| 7,205,738 B2 * | 4/2007 | Chapman et al. | 318/400.12 |
| 7,208,908 B2 * | 4/2007 | Anghel | 318/400.02 |
| 7,268,441 B2 * | 9/2007 | Asao et al. | 318/400.09 |
| 7,446,582 B2 * | 11/2008 | Glatzmaier | 327/233 |
| 2002/0047319 A1 | 4/2002 | Ferrari et al. | |
| 2002/0116961 A1 | 8/2002 | Kim et al. | |
| 2002/0117922 A1 | 8/2002 | Kim et al. | |
| 2002/0117926 A1 | 8/2002 | Joong et al. | |
| 2002/0117927 A1 | 8/2002 | Kim et al. | |
| 2002/0117933 A1 | 8/2002 | Joong et al. | |
| 2002/0158520 A1 | 10/2002 | Takamune et al. | |
| 2005/0184689 A1 * | 8/2005 | Maslov et al. | 318/254 |

FOREIGN PATENT DOCUMENTS

| | | |
|---|---|---|
| JP | 2001-069609 A | 3/2001 |
| JP | 2002-262487 A | 9/2002 |
| JP | 2002-262488 A | 9/2002 |
| JP | 2002-262489 A | 9/2002 |
| JP | 2002-262493 A | 9/2002 |
| JP | 2002-262494 A | 9/2002 |
| JP | 2003-244874 A | 8/2003 |

* cited by examiner

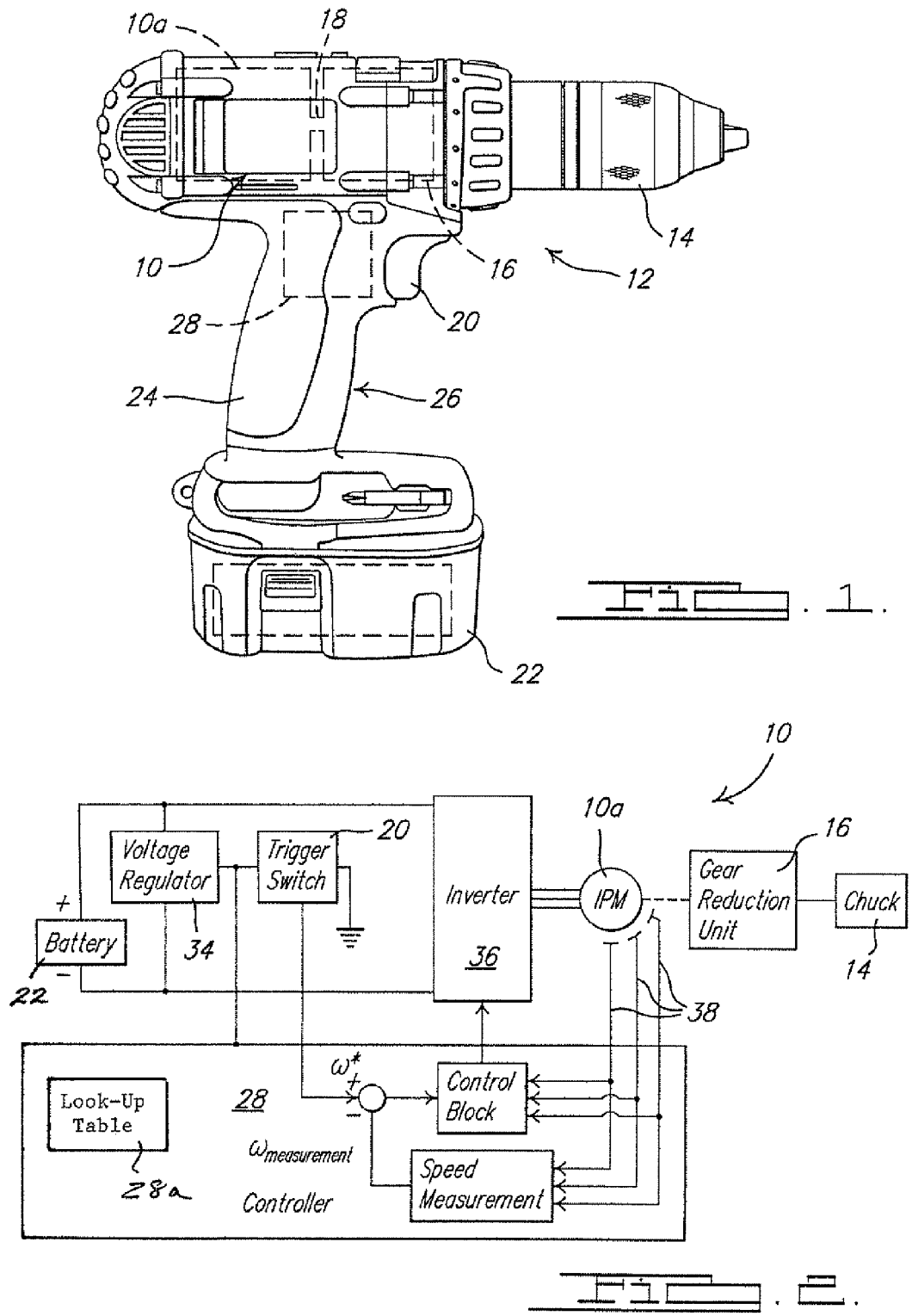

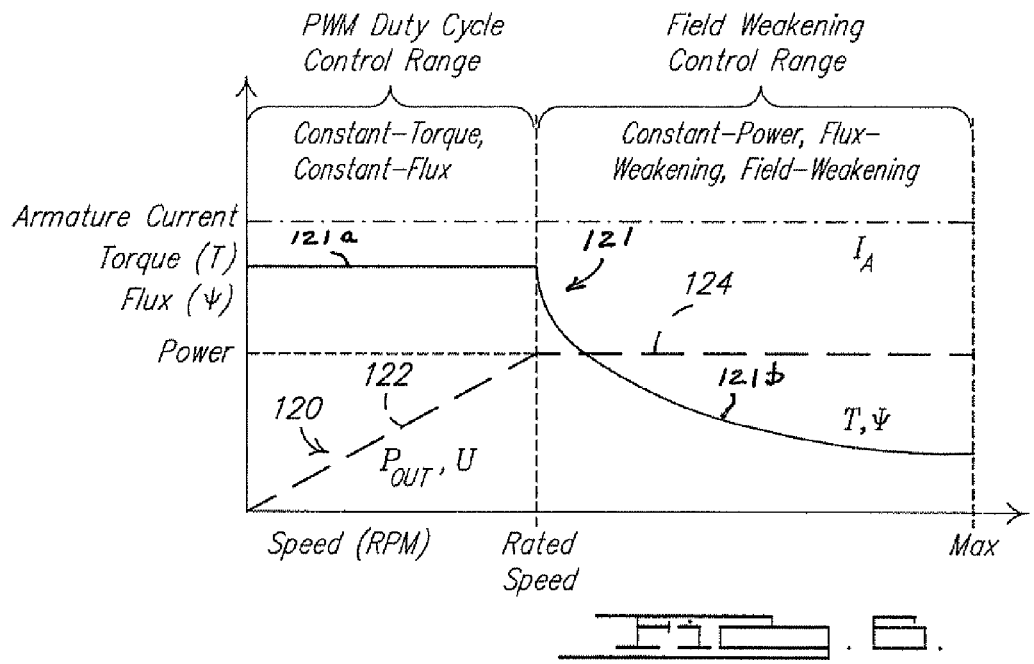
FIG. 6.
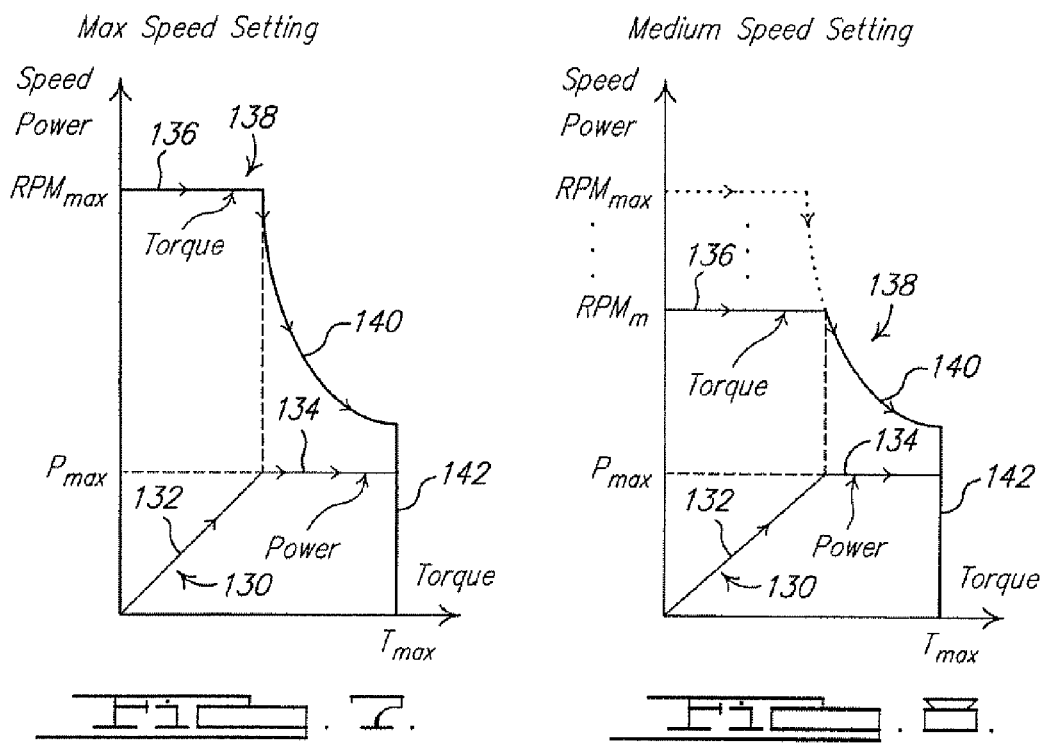
FIG. 7.
FIG. 8.

ELECTRONICALLY COMMUTATED MOTOR AND CONTROL SYSTEM EMPLOYING PHASE ANGLE CONTROL OF PHASE CURRENT

CROSS-REFERENCE TO RELATED APPLICATIONS

This present application claims the benefit of U.S. Provisional Patent Application Ser. No. 60/802,460 filed on May 22, 2006. This application is also generally related in subject matter to U.S. Non-Provisional Patent Application Ser. No. 11/676,482, filed Feb. 19, 2007, entitled "Electronically Commutated Motor and Control System", and also to PCT International Patent Application Serial No. PCT/US2007/004541 filed on Feb. 20, 2007 entitled "DC Motor with Dual Commutator Bar Set and Selectable Series and Parallel Connected Coils", the disclosures of which are hereby incorporated by reference into the present application.

FIELD

The present system and method relates to electronically commutated motors. More particularly, the present system and method relates to an electronically commutated brushless motor for a power tool, where the motor and its controller may provide relatively a constant power output and relatively a constant efficiency over a wide speed range, and/or where the motor performance may reduce or eliminate the need for a complex gear reduction unit.

BACKGROUND

The statements in this section merely provide background information related to the present disclosure and may not constitute prior art.

When using a power tool, different speeds and torques may be desirable depending upon the particular application of the power tool. For example, when using a power saw to cut pressure treated lumber, a lower speed, higher torque output may be desirable. But when cutting soft woods, a higher speed, lower torque output may be more desirable. When the motor in the power saw is only able to produce its maximum power output at a single speed, then maximum motor output power may not be available for those work tasks that need to be performed at speeds above or below the speed at which maximum power occurs. In terms of tool performance, this may increase the time needed to perform a given task, over the time needed if the motor was being operated at its maximum power output. Additionally, if the power saw is battery operated, the run time of the tool on a given charge may be reduced from that which would be achieved if the motor in the power saw was being operated at maximum efficiency.

SUMMARY

The present system and method is directed to a power tool making use of an electronically commutated motor. A combination of pulse width modulation and phase angle control of the phase current applied to the motor may be used to electronically control the motor in a manner that enables the motor to generate a relatively constant power output and constant efficiency over a wide speed range. This may eliminate the need for a highly complex gear reduction unit.

The motor of the present system and method forms a brushless permanent magnet motor having a rotor with multiple permanent magnets mounted thereon. The rotor may also have multiple cavities filled with air or other non-magnetic materials. The permanent magnets may be internally mounted in a back iron of the rotor, as opposed to being surface mounted. The interior mounted permanent magnets may produce both reluctance torque and magnetic torque. The magnetic torque is generated by the flux from the permanent magnets, while the reluctance torque is provided because of the different flux paths that are produced by the interior mounting of the permanent magnets and the cavities in the back iron of the rotor.

A control system may be used that implements, in one exemplary form, pulse width modulation (PWM) control until the motor reaches a point of generally maximum power output, after which "field weakening" may be implemented to maintain substantially constant power over a wide speed range. The field weakening may be implemented by controlling the advance angle of the phase current being used to excite the motor. The phase current may be varied to counteract the increasing back EMF (electromotive force) generated by the motor as increasing torque is demanded from the motor. By switching from PWM control to field weakening control, both the power and efficiency of the motor can be held relatively constant over a greater range of operating speeds of the motor. In effect, the use of field weakening essentially acts as an electronic "transmission" that enables the motor output power and efficiency to be held relatively constant while the speed of the motor drops in response to increasing torque demand. The system and method of the present application thus may reduce or eliminate the need for complex transmissions that might otherwise be needed with a motor to achieve the same degree of control over output power and efficiency over a given speed range. The present system and method further may reduce or eliminate the need for the use of complex mechanical arrangements for physically shifting the magnets on the rotor.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 1 is an elevational view of an exemplary power tool with which the motor of the present system may be used;

FIG. 2 is a simplified exemplary block diagram of a control system implemented with the present system and method;

FIG. 5 is an exemplary flow chart illustrating a methodology for implementing PWM and field weakening control over the motor of FIG. 2;

FIG. 6 is an exemplary graph illustrating where PWM control and where field weakening control are used to maintain a constant power output over a wide speed range for the motor;

FIG. 7 is an exemplary graph illustrating the use of field weakening for a maximum speed setting of the power tool of FIG. 1;

FIG. 8 is an exemplary graph illustrating the use of field weakening for a medium speed setting of the power tool of FIG. 1;

DETAILED DESCRIPTION

Figure 3:
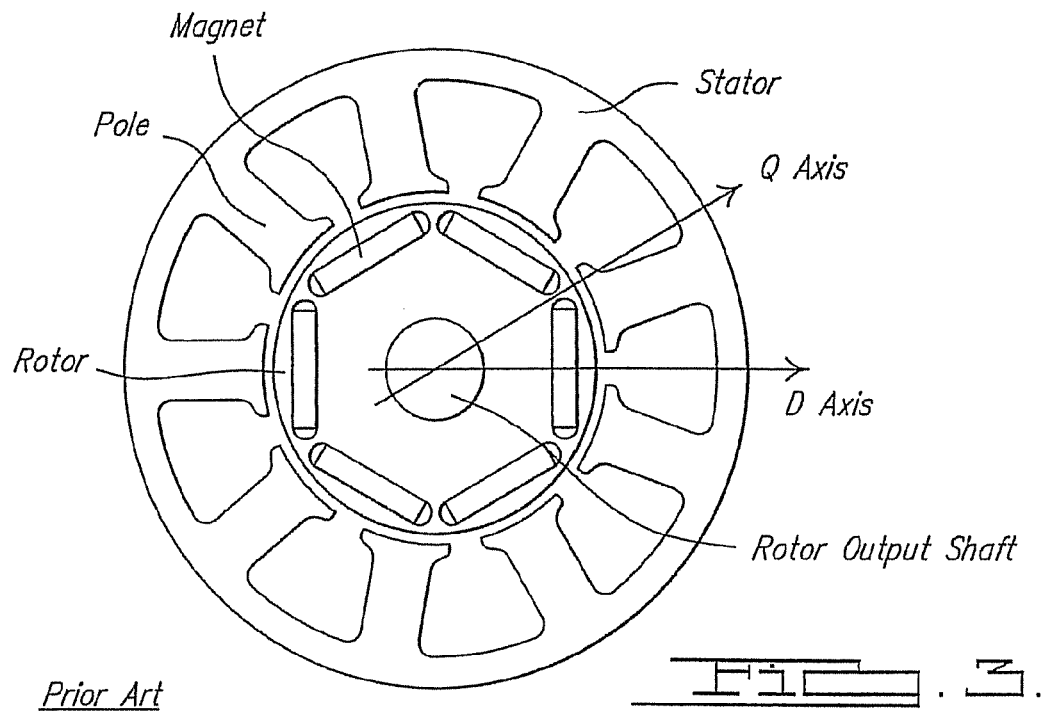
FIG. 3 is a simplified exemplary cross sectional end view of a brushless permanent magnet motor (without the phase windings) illustrating a rotor of the motor having internally mounted permanent magnets and cavities.

The following description is merely exemplary in nature and is not intended to limit the present disclosure, application, or uses. It should be understood that throughout the drawings, corresponding reference numerals indicate like or corresponding parts and features.

Referring to FIG. 1, a power tool in the form of a drill 12 incorporating a motor system 10 is shown. It will be appreciated immediately that while the power tool is illustrated as a drill 12, that the motor 10 system can be implemented in a wide variety of other power tools such as saws, sanders, routers, drill presses, lathes, router shapers, table saws and virtually any form of DC or AC powered tool or device.

Referring further to FIG. 1, the exemplary drill 12 typically includes a chuck 14 coupled to an output of a gear reduction unit 16. An input of the gear reduction unit 16 is coupled to an output shaft 18 of an electronically commutated motor 10a of the motor system 10. A trigger 20 may be used to turn on and off the motor 10a and to control the speed of the motor. A rechargeable battery 22 is held within or attached to a handle portion 24 of a housing 26 of the drill 12. A controller 28 is also disposed in the handle portion 24, but could instead be located at other locations within the tool 12. The controller 28 may be in communication with the trigger 20 and the motor 10a, and may include a look-up table 28a. The look-up table 28a may be included in a memory associated with the controller 28, as illustrated in FIG. 2, or alternatively stored in a completely independent memory component. The controller 28 may be used to control the motor 10a and will be described in greater detail below.

Referring to FIG. 2, a simplified exemplary block diagram of the motor system 10 components is shown. A voltage regulator 34 may be used to provide a regulated DC voltage to the controller 28 and other electronic components used in the drill 12. The controller 28 may be a microcontroller having a speed measurement subsystem and a node for summing the user selected speed, as indicated by the position of the trigger 20, with the measured speed of the motor 10a. An inverter subsystem 36 may be controlled by the controller 28 and used to provide drive signals to phase windings of the motor 10a.

Hall effect sensors 38 may be used for speed detection to detect and monitor the speed of the motor 10a. Sensorless methods or other types of sensors also may be used including, for example, optical or magnetic encoders and resolvers.

In one exemplary implementation, the inverter 36 may include six independent switches (e.g., MOSFETS) that are controlled by the controller 28 to control the supply voltage to the windings of the motor 10a. However, the present system is not limited to the use of any particular number of switches or any particular number of phases. The supplied voltage to the motor 10a may be changed using a pulse width modulation (PWM) control technique. The use of the Hall effect position sensors 38, in connection with the look-up table 28a accessed by the controller 28, may eliminate the need to use current sensing techniques for controlling the motor 10a.

As will be appreciated, the maximum voltage that can be supplied to the phase windings of the motor 10a may be limited. As the motor 10a speed increases, the back EMF increases proportionally with the increase in motor speed. In particular cases involving motor speeds near the maximum speed of the motor 10a, the back-EMF may be even higher than the maximum voltage that is able to be supplied by the inverter 36. Thus, the inverter 36 cannot supply sufficient energy to the motor 10a to overcome the growing back EMF.

To overcome the increasing back EMF at high motor speeds, or when maximum output power of the motor 10a is reached but the torque demand on the motor 10a continues to increase, the technique of "field weakening" control may be used. Field weakening involves reducing the flux of the permanent magnets mounted in the rotor of the motor 10a, which results in a reduction of the back EMF generated by the motor at speeds beyond the rated speed of the motor 10a, or when maximum motor power output is reached but the torque demand on the motor continues to increase. Field weakening involves controlling the excitation of the motor by the use of control over the phase angle of the current supplied to the phase windings of the motor 10a. Advancing the phase current in relation to the back EMF causes a decreasing resultant airgap flux in the motor, which may result in a lower back EMF and a lower torque that is able to be produced by the permanent magnets. However, the reluctance torque may increase as the phase current is advanced. This is because, with an internal permanent magnet rotor and/or cavities, two types of torque may be present: the torque resulting from the flux from the permanent magnets mounted in the rotor, as well as a reluctance torque. With brief reference to FIG. 3, a brushless permanent magnet rotor and stator are shown. The motor in this example is a three phase, nine slot, six pole motor. However, the present system and method is not limited to such motors, but could just as readily be implemented in a motor having more or less than three phases, and a greater or lesser number of poles and slots.

Because of the internally mounted permanent magnets, the rotor forms a "salient" structure. By "salient", it is meant that the inductances along the direct and quadrature axes (D axis and Q axis, respectively), are not equal, and therefore a reluctance torque is created. Thus, each permanent magnet has associated with it an inductance along the D axis, as well as an inductance along the Q axis ($L_d$ and $L_q$, respectively). The total magnetic torque is the vector sum of the magnetic and reluctance torques. The internally mounted magnets may be mounted such that they include different axes of orientations.

In another exemplary implementation, other types of motors may be used. For instance, a brushless motor with surface mounted permanent magnets having a magnetic steel band around the magnets may function similar to a brushless motor having internally mounted permanent magnets.

Figure 4:
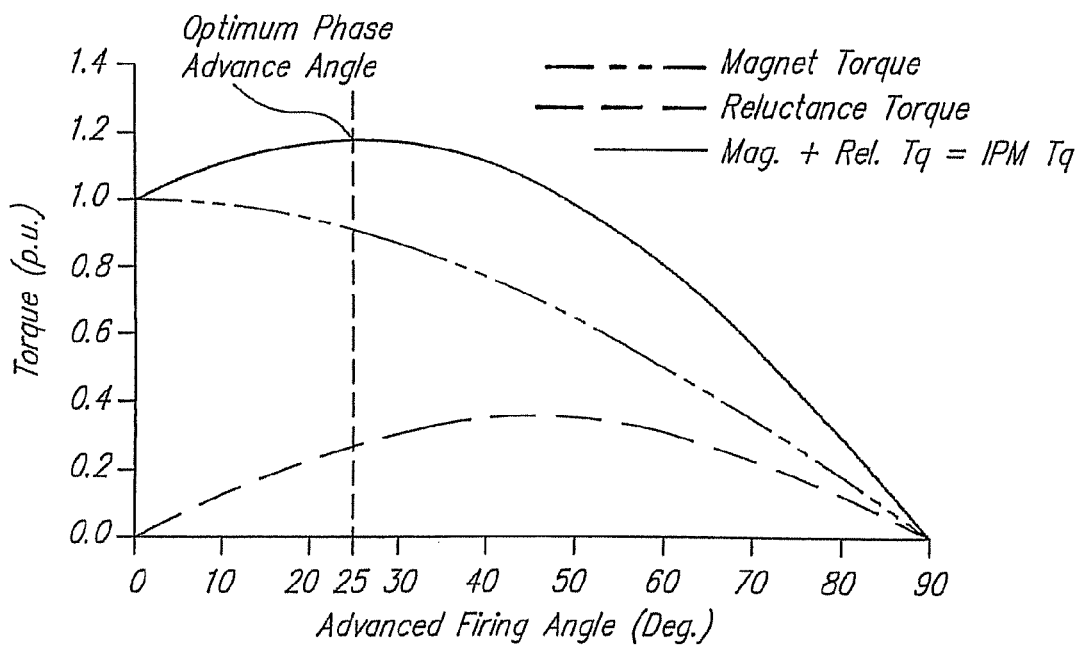
FIG. 4 is an exemplary graph that illustrates the torque components that make up the total torque generated by the motor of FIG. 3.
Figure 3:
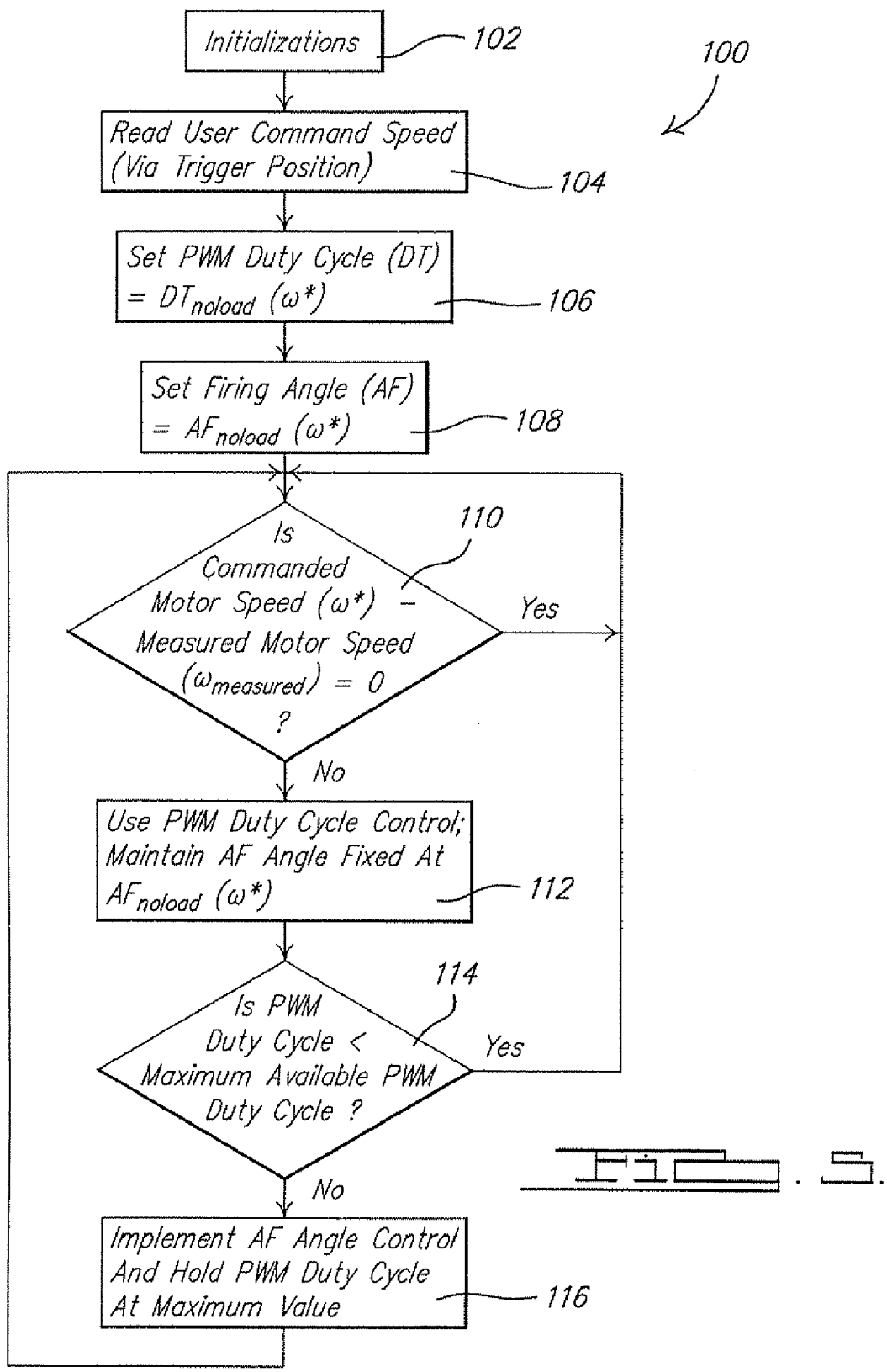

FIG. 4 illustrates the total torque generated by the magnetic and reluctance torques associated with the motor of FIG. 3. From FIG. 4 it will be noted that the maximum reluctance torque occurs when the phase current is advanced by 45° from the back EMF generated by the motor 10a. The magnet torque, however, is maximized when the phase current is aligned with the back EMF. Thus, it will be realized that implementing an advance of the phase current will reduce the magnet torque and the back EMF produced by the motor 10a, but by doing so the amount of reluctance torque will increase. Hence, from FIG. 4, the optimum phase advance angle to maximize the total torque for this particular example will be 25°. Thus, by advancing the phase current by 25° beyond the phase of the back EMF voltage, the resultant torque of the motor 10a is maximized. Maximizing the resultant torque with respect to available voltage enables higher torque density, higher power density, higher efficiency and a constant power and a constant efficiency to be obtained from the motor beyond what would be able to be obtained from an internal permanent magnet rotor without field weakening. This will be explained further in the following paragraphs.

Referring now to FIG. 5, an exemplary flow chart 100 is illustrated that sets forth a control scheme for implementing both PWM control and phase angle (i.e., field weakening) control over the motor 10a. Phase angle control, in this flow chart, is designated by the term "AF", which means "advanced firing" angle. The term "advanced firing" angle simply is a different terminology for phase advance.

With specific reference to FIG. 5, at operation 102, the controller 28 performs an initialization sequence to initialize all variables which it may use in monitoring and controlling operation of the motor 10a. At operation 104, the controller 28 senses the commanded motor speed via the trigger switch 20 output. In operation 106, the PWM duty cycle is set by the controller 28 to equal the PWM duty cycle used for a "no load" condition at the user commanded motor speed. This information is obtained from the look-up table 28a accessed by the controller 28 which includes duty cycle values that cover the operating speed range of the motor 10a. In operation 108, the firing angle "AF" is set equal to $AF_{no\ load}$ at the user commanded motor speed ($\omega^*$), with the firing angle "AF" also being obtained from a look-up table that is accessed by controller 28.

At operation 110, a determination is made as to whether the commanded motor speed minus the actual measured motor speed is equal to zero. If the answer to this determination is "Yes", operation 110 is repeated. If the answer to this inquiry is "No", then at operation 112 the controller 28 implements the PWM duty cycle control and sets the AF angle advance equal to a fixed value of $AF_{no\ load}$ at the user commanded motor speed ($\omega^*$), which is obtained from a look-up table accessed by controller 28.

At operation 114, a check is made to determine if the PWM duty cycle presently in use is less than the maximum available PWM duty cycle. If the answer to this inquiry is "Yes", then operation 110 is repeated. If the answer is "No", then operation 116 is performed to turn on the advanced firing (AF) angle control, and to hold the PWM duty cycle at the maximum value. Once operation 116 is performed, the method may loop back to again perform operation 110. Thus, PWM duty cycle control may be used until the point that the maximum available duty cycle is reached. At that point, advanced firing angle control may be implemented to advance the phase current to maximize the amount of torque per ampere.

The above control scheme is further illustrated graphically in FIG. 6. FIG. 6 shows a curve 120 representing the power output and phase voltage of the motor 10a at various motor speeds, as well as an exemplary torque/flux curve 121 representing the torque and flux generated by the motor at different motor speeds. Portion 122 of curve 120 is a linear, increasing portion during which PWM duty cycle control may be employed. Portion 124 of curve 120 represents a flat, constant linear portion during which field weakening may be employed via the advanced angle control described in connection with FIG. 5. Portion 121a of curve 121 illustrates that the torque and flux generated by the motor 10a is constant until the point at which maximum power output of the motor 10a is reached. Portion 121b illustrates the torque and flux output of the motor 10a falling as the speed of the motor 10a continues to increase beyond the point of maximum power output of the motor 10a, as a result of the use of field weakening. From FIG. 6 it will also be noted that while the torque decreases together with the total flux, the output power from the motor 10a remains constant, coincident with portion 124 of curve 120. This characteristic enables the controller 28 to electronically control the motor 10a in a manner similar to what would be achieved with a continuously variable transmission. The controller 28 controls the advanced firing angle as needed once the rated motor speed is reached such that maximum power is maintained.

Figure 9:
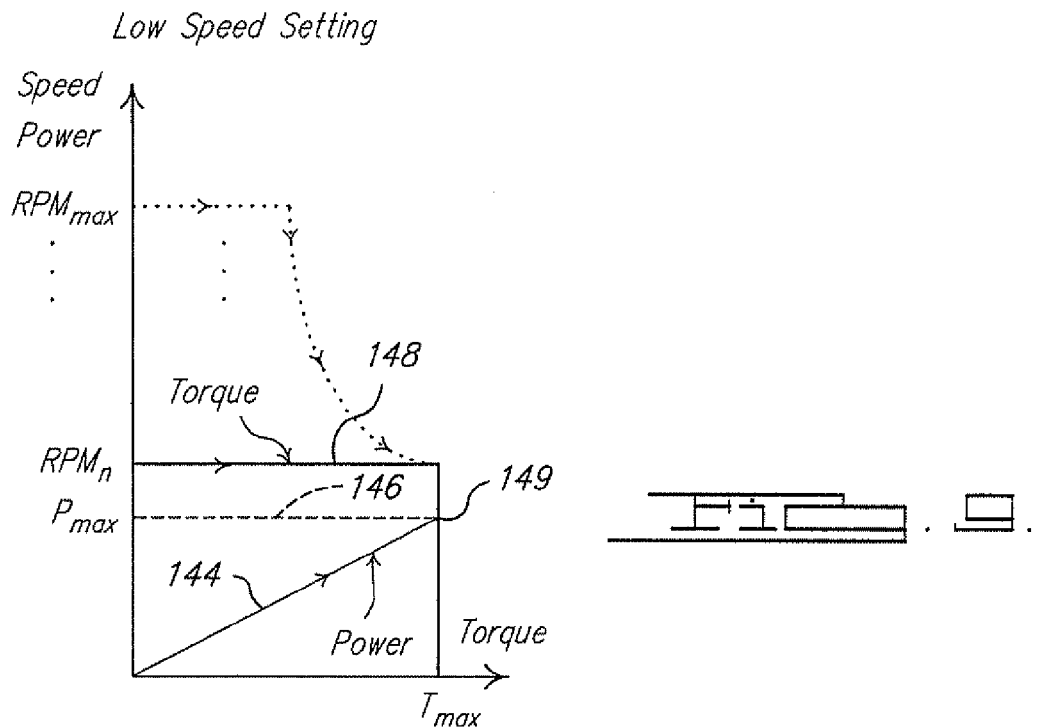
FIG. 9 is an exemplary graph illustrating the use of only PWM control for the power tool of FIG. 1 when the power tool is set at a low speed setting.

The above is further illustrated in the exemplary graphs of FIGS. 7, 8 and 9, which represent the power output of the motor 10a intended for use in a power tool (such as, for example, the power tool 12 in FIG. 1) at various speed settings. In FIG. 7, a maximum speed setting, for example 17,000 rpm, is denoted, meaning that the trigger 20 is fully engaged. Motor power output curve 130 includes a linear increasing portion 132 and a linear constant portion 134. During the linear, increasing portion 132, the output torque of the motor 10a is constant, as indicated by portion 136 of torque curve 138. Once the maximum power output from the motor 10a is reached, but still higher torque is demanded by the user, advanced firing angle control is used to increase the reluctance torque, which causes a drop in motor speed as overall torque from the motor, as indicated by portion 140 of torque curve 138, continues to increase. The torque output from the motor 10a increases until a maximum torque value is reached, which is represented by portion 142 of curve 140.

In FIG. 8, a "medium speed setting", for example 12,000 rpm, also illustrates that advanced firing angle control may be used to reduce the motor speed as the output torque of the motor increases, after the point at which maximum power output from the motor is reached, as represented by portion 134 of curve 130.

In FIG. 9, a low speed setting, for example 5000 rpm, is illustrated. In this instance, the total output power of the motor 10a is represented by linear, increasing curve 144, with the maximum power output of the motor denoted by dashed line 146. The output torque of the motor 10a is constant, as indicated by curve 148, until the point 149 at which maximum power is reached. Advanced firing angle control is thus not needed at the low speed setting illustrated in FIG. 9 because operation of the motor 10a does not continue beyond its rated speed.

Figure 10:
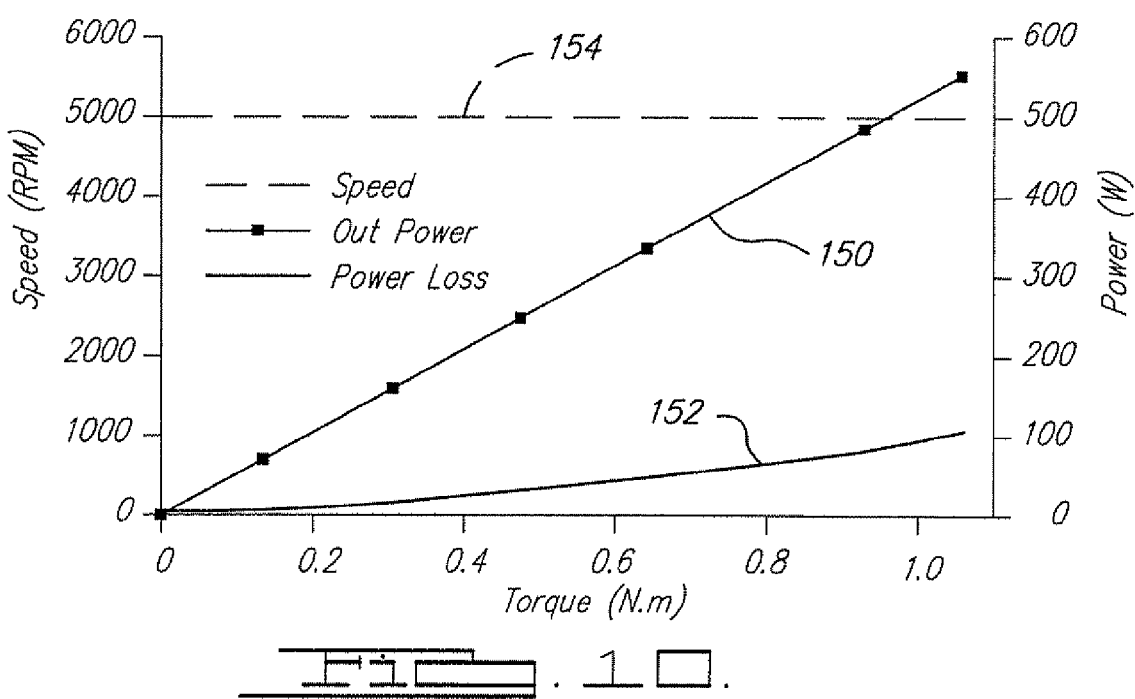
FIG. 10 is an exemplary graph of motor output power and power loss at a constant speed of 5000 rpm (i.e., a low speed setting), in response to a gradually increasing torque demand.

FIGS. 10-15 further illustrate the performance characteristics provided by the advanced firing angle control of the present system and method. FIG. 10 illustrates exemplary graphs of a motor power output curve 150 and a power loss curve 152 while motor speed is held constant at 5,000 rpm, as indicated by curve 154. The power loss increases only slightly with motor speed as the torque demand increases. No field weakening is employed in this example.

Figure 11:
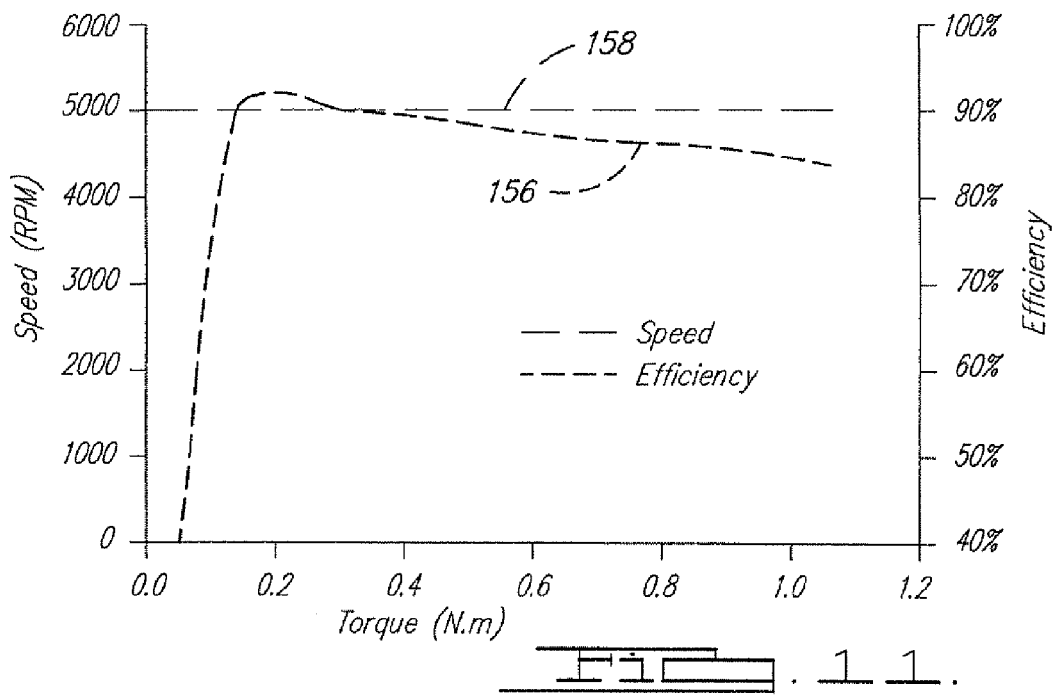
FIG. 11 is an exemplary graph of the efficiency of the motor at different torque output levels and at a constant speed of 5000 rpm (i.e., a low speed setting)

In FIG. 11, curve 156 represents the efficiency of the motor 10a at a constant motor speed of 5,000 rpm, represented by dashed line 158, as the torque requirement imposed on the motor increases. Again, efficiency remains relatively constant.

Figure 12:
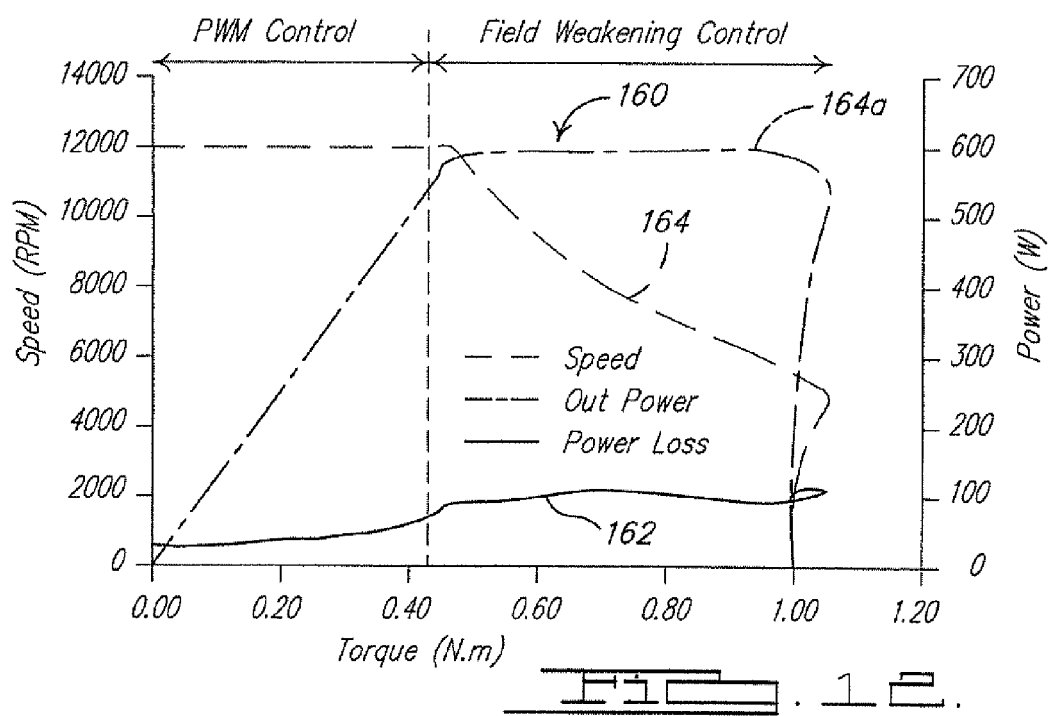
FIG. 12 is an exemplary graph showing the motor speed, output power and power loss in relation to output torque at a medium speed setting of 12000 rpm.

FIG. 12 illustrates curve 160 representing motor output power, curve 162 representing power loss, and curve 164 representing motor speed to illustrate how the power loss remains relatively constant during the range over which field weakening control is employed. Output power, as represented by portion 164a of curve 160, also remains generally constant until the maximum torque output of the motor 10a is reached.

Figure 13:
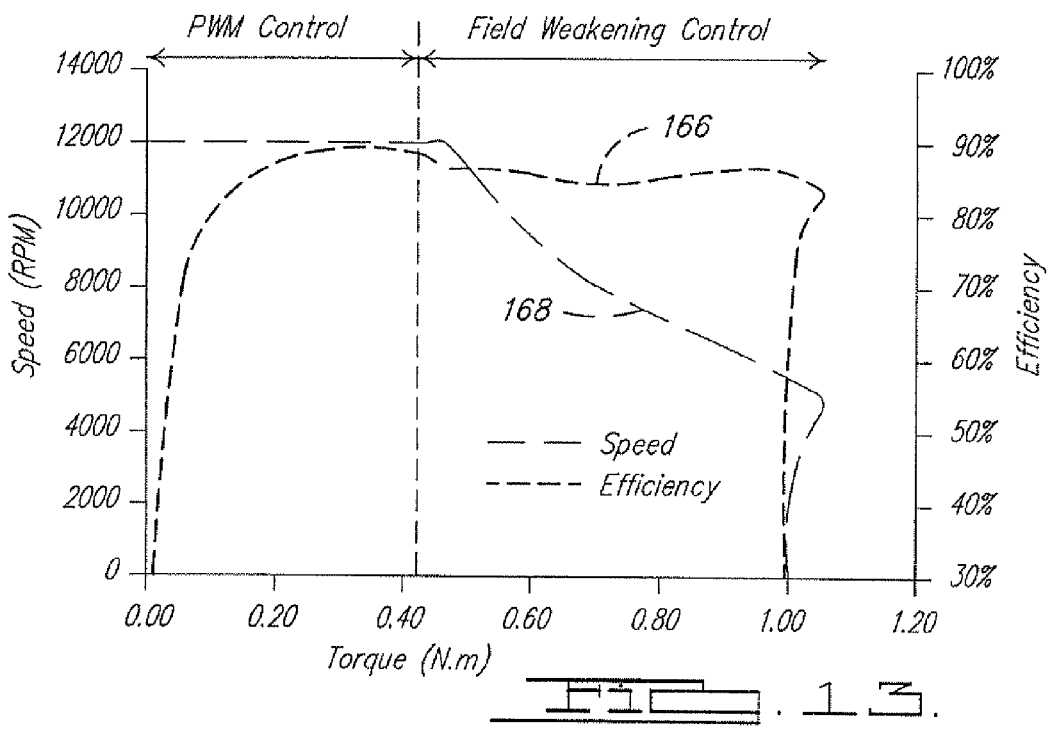
FIG. 13 is an exemplary graph that illustrates the ranges over which PWM and field weakening control are used, as well as the effect on motor output power and efficiency in each range at a medium speed setting of 12000 rpm.
Figure 14:
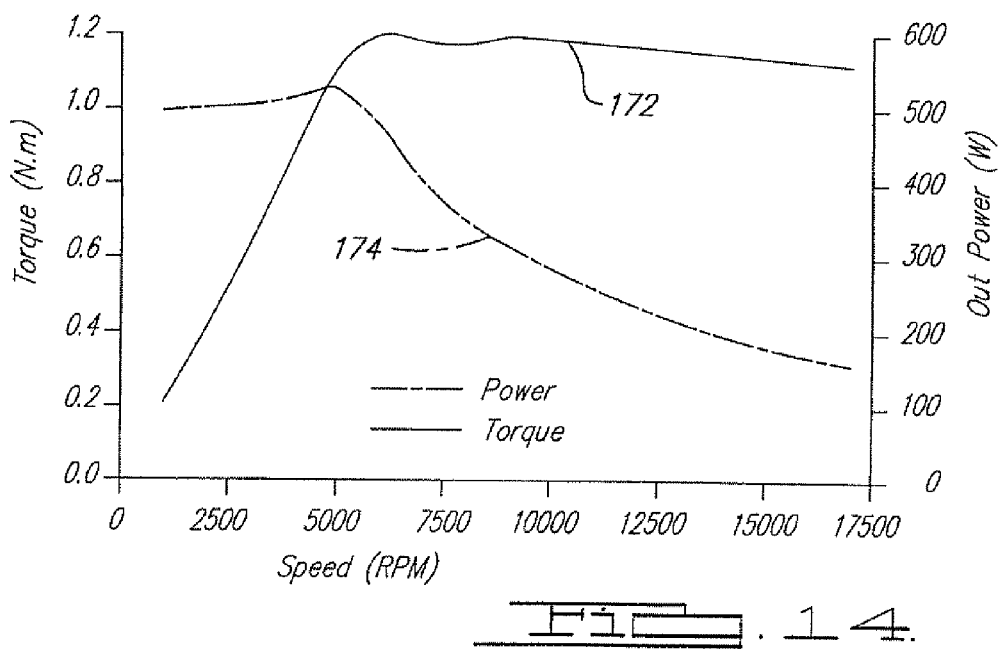
FIG. 14 is an exemplary graph showing the motor output power and torque over the entire range of operating speeds of the motor of FIG. 1.

In FIG. 13, curve 166 represents motor efficiency and curve 168 represents motor speed. Again, during the portion of operation during which field weakening is employed, motor efficiency remains generally constant up to the point at which maximum output torque of the motor 10a is reached. FIG. 14 illustrates the motor torque, represented by curve 174, and the motor output power represented by curve 172, as a function of motor speed. In curve 174, as torque starts dropping, field weakening control is implemented.

Figure 15:
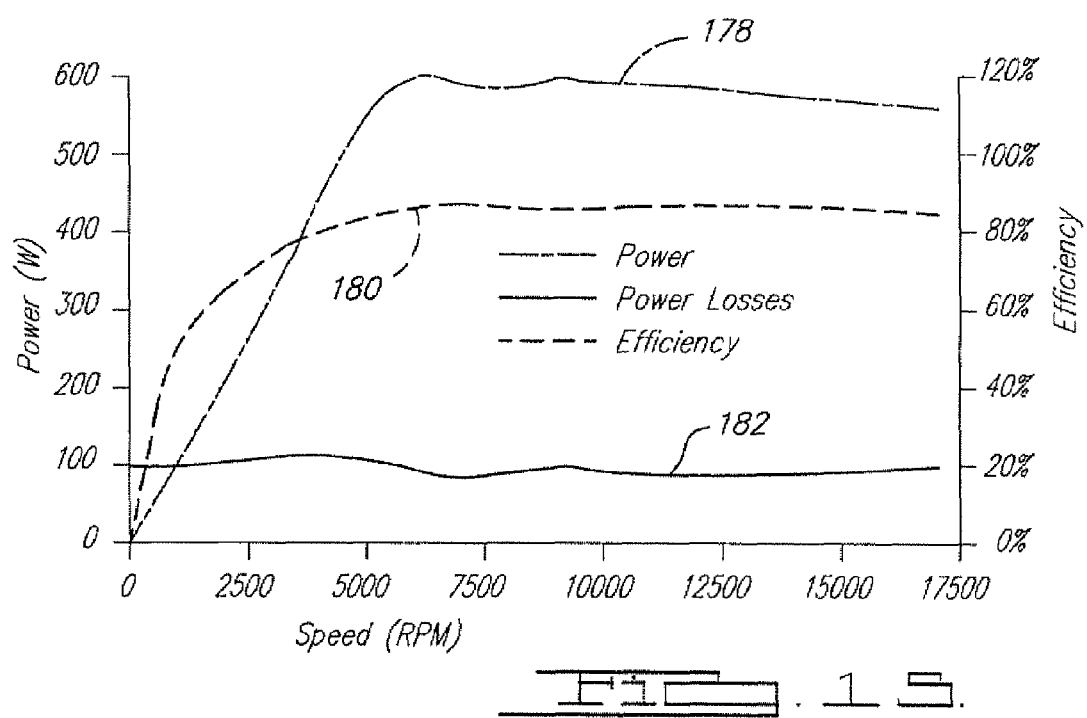
FIG. 15 is an exemplary graph showing motor output power, power loss and efficiency over the entire range of operating speeds of the motor of FIG. 1.

FIG. 15 is an exemplary graph illustrating motor output power 178, motor efficiency 180 and power loss 182 as a function of changing motor speed. Again, efficiency, power loss and output power remain relatively constant once maximum motor output power is reached.

It should be noted that while the exemplary graphs in FIGS. 10-15 may illustrate certain operating conditions, the shape of the graphs may vary based on different motor operating conditions and that these graphs are merely exemplary of a small sample of different motor operating conditions.

In one exemplary implementation with the present motor system 10, the motor 10a can reach about 80% of maximum output power with less than 5% variation in speed for at least 33% of different speed settings from zero speed to maximum motor speed. The present motor system 10 further enables the motor 10a to develop at least about 80% of maximum output power at the highest speed setting for the power tool 12, and to maintain the output power to at least about 80% of maximum motor output power to reach maximum torque.

Because the motor system 10 enables the motor 10a to develop a relatively constant output power and efficiency over a wide range of speeds, rather than at just one predetermined motor speed, the user can set the power tool to a given speed and thereafter the system 10 can deliver maximum power and efficiency, even as the motor 10a speed fluctuates due to the demands of the work task. For many work tasks involving hand-held power tools, this can reduce the user fatigue that is experienced while using the tool and/or decrease the amount of time needed to perform a given task. Regardless of the force that the user exerts, the ability of the motor 10a to operate at a constant maximum power and maximum efficiency over a wide speed range ensures that the work task will be completed with a minimum amount of physical effort from the user. Being able to operate over a wide speed range, while still achieving maximum efficiency, further ensures that the run time of a battery powered tool employing the motor system 10 may be maximized.

With the present motor system 10, it is feasible to implement a control scheme for a power tool that enables operation of a power tool at a maximum watts output condition, and maximum efficiency condition, over a wide speed range (as set by a user controlling the tool). For example, a control scheme can be implemented where a power tool employing the motor 10a is able to operate at maximum watts output, and at maximum efficiency, from maximum speed to 25% of the maximum speed (such as between 20,000 rpm-5000 rpm). Alternatively, such a control scheme would enable high efficiency (i.e., actually maximum efficiency) operation at a wide load range (i.e., low, medium, and high loads). Still further, the present motor system 10 can be used to implement a control scheme for a power tool where motor output power is permitted to drop no more than a predetermined amount, for example 10%, 25% or 50% over the entire operating speed range of the motor 10a. Depending on what amount of output power drop is deemed to be acceptable, the speed range may be 1:1, 1:10, or some intermediate range.

The present motor system 10 also may enable a control scheme to be implemented whereby motor 10a efficiency drops only by a maximum predetermined amount, for example no more than 10%, 25%, 50%, etc., from maximum efficiency, over the entire operating speed range of the motor 10a.

The system and method described in the present application also enables a form of "electronic" gear or "continuously variable" gear reduction to be implemented that supplements a transmission used in a power tool to modify the output speed of a permanent magnet, brushless motor used in the power tool. The present system and method may reduce, or may entirely eliminate, the need for a complex transmission. Phase angle control and field weakening can be used to control the growing back EMF generated by the motor, after the point at which maximum output power of the motor 10a is reached but the torque demand on the motor continues to increase. The motor and control system of the present system and method may provide higher torque density, higher power density and higher efficiency than a brushless, permanent magnet motor, where the magnets are mounted on the surface of the rotor. In the present system and method, the output power of the motor may be essentially constant over a wider speed range, while the efficiency also may remain relatively constant over the same speed range. The system and method can be integrated to work with an existing fixed gear reduction system to achieve even better constant output power and constant efficiency over a wider speed range, or potentially could be used in place of a gear reduction system (i.e., transmission).

The description of the various embodiments, as provided herein, is merely exemplary in nature and, thus, variations that do not depart from the gist of the descriptions provided are intended to be within the scope thereof. For instance, the systems and methods described above may be used in generally lower speed applications such as, for example, stationary power tools such that the tools may be configured to be direct drive type tools.

What is claimed is:

1. A method of controlling a power tool, comprising:
providing a power tool with an electronically commutated motor for driving a working implement of the power tool;
using a gear reduction unit in communication with an output of the electronically commutated motor, which in turn drives the working implement;
using an electronic control system to implement a field weakening control technique to limit a back electromotive force (EMF) generated by the electronically commutated motor, the electronic control system determining a phase advance angle for a current supplied to the electronically commutated motor to implement a degree of field weakening; and
using the field weakening control technique to control a resultant torque generated by the electronically commutated motor by controlling the phase advance angle of the current applied to the electronically commutated motor so that at least one of a substantially constant power output and a substantially constant efficiency is achieved over a desired operating speed range of the electronically commutated motor.

2. The method of claim 1, wherein controlling a resultant torque generated by the electronically commutated motor comprises using a reluctance torque produced by the electronically commutated motor to help achieve at least one of a substantially constant power output and a substantially constant efficiency.

3. The method of claim 1, wherein using a field weakening technique to limit back EMF comprises using a field weakening technique to limit back EMF only when a rated speed of the electronically commutated motor is reached and a speed of the electronically commutated motor attempts to increase beyond the rated speed.

4. The method of claim 1, wherein using a field weakening technique to limit back EMF comprises using a field weakening technique to limit back EMF only once a maximum power output of the electronically commutated motor is reached and a speed of the electronically commutated motor continues to increase beyond a speed at which the maximum power output is reached.

5. The method of claim 1, further comprising using a pulse width modulation (PWM) control technique to control a power output of the electronically commutated motor during a first operating speed range; and using the field weakening technique during a second speed range for the electronically commutated motor that exceeds the first speed range.

6. The method of claim 1, wherein using a field weakening technique comprises using a look-up table to obtain the phase advance angle by which a phase of a current applied to the electronically commutated motor is advanced, with the phase advance angle controlling an amount of field weakening that is employed as the field weakening technique is implemented.

7. A method of controlling a power tool, comprising:

providing a power tool with an electronically commutated motor for powering a working implement of the power tool, the electronically commutated motor including a rotor having multiple internally mounted permanent magnets;

using a gear reduction unit to receive an output from the electronically commutated motor, and to drive a working implement of the power tool;

using a pulse width modulation (PWM) control technique to control operation of the electronically commutated motor until a substantially maximum power output of the electronically commutated motor is reached;

once the substantially maximum power output of the electronically commutated motor is reached, using a field weakening control technique to reduce a back EMF generated by the electronically commutated motor such that an output power of the electronically commutated motor is maintained at a substantially constant level over a predetermined motor speed range, and such that the speed of the electronically commutated motor is decreased; and wherein using the field weakening control technique comprises using a look-up table to obtain a phase advance angle by which the current signal applied to the electronically commutated motor is advanced.

8. The method of claim 7, wherein providing a power tool further comprises providing a power tool having a rotor that includes internal cavities, with the internal cavities being filled by at least one of air and non-magnetic material.

9. The method of claim 7, wherein the field weakening control technique enables a substantially constant motor efficiency to be obtained over the predetermined motor speed range.

10. The method of claim 7, wherein the using a field weakening control technique comprises increasing a reluctance torque output of the electronically commutated motor for operation of the electronically commutated motor beyond an operating point at which maximum motor output power is reached.

11. A method of controlling a motor driven power tool, comprising:

providing a motor of a power tool having a rotor and multiple internally mounted permanent magnets;

using an output of the motor to drive a gear reduction unit, an output of the gear reduction unit driving a working implement of the power tool;

controlling a voltage of an input signal applied to the motor so that variable motor power is available to the gear reduction unit, and thus to the working implement, based on a user input being provided to the power tool; and for operation of the motor after a point at which maximum power output of the motor is reached but an increasing torque demand is being placed on the motor, using a field weakening control technique including controlling a phase advance angle of a current of the input signal applied to the motor to controllably increase a reluctance torque generated by the motor, and to decrease a speed of the motor, and thus decrease a back EMF being generated by the motor, such that motor power and motor efficiency of the motor are maintained substantially constant while the speed of the motor is decreased.

12. The method of claim 11, wherein the controlling a voltage of an input signal applied to a motor having a rotor includes controlling the voltage of a motor having a rotor with a plurality of internal cavities filled with at least one of air and non-magnetic material.

13. The method of claim 11, wherein the controlling a voltage of an input signal applied to the motor to provide a variable motor power comprises using a pulse width modulation (PWM) control technique to control a duty cycle of a phase current applied to the motor.

14. The method of claim 11, wherein the controlling a phase advance angle comprises obtaining a phase advance angle from a look-up table based on information from at least one of an operating speed and a load of the motor.

15. The method of claim 14, wherein the controlling a phase advance angle comprises obtaining a phase advance angle from a calculation based on information from at least one of an operating speed and a load of the motor.

16. A power tool comprising:

an electronically commutated motor having a rotor, the rotor having multiple internally mounted permanent magnets;

a gear reduction unit responsive to an output of the electronically commutated motor, an output of the gear reduction unit being in communication with a working implement of the power tool;

a switching subsystem for generating drive signals for electrically powering the electronically commutated motor;

a controller for controlling the switching system to implement:

a first control technique to obtain a variable power output from the electronically commutated motor until a maximum power output for the electronically commutated motor is reached, in response to reaching a first torque output level; and a second control technique involving field weakening when a torque output of the electronically commutated motor is increased beyond the first torque output level to a second torque output level, such that a substantially constant motor output power and efficiency between the first and second torque output levels is maintained while a speed of the electronically commutated motor is decreased;

the second control technique including controlling a phase advance angle of a current component of the drive signals to implement a degree of phase angle advance of the current component of the drive signals; and a look-up table accessible by the controller, the look-up table including a plurality of advance angles usable by the controller to control the phase angle of the current component of the drive signals applied to the electronically commutated motor.

17. The power tool of claim 16, wherein the rotor further includes a plurality of internal cavities filled with at least one of air and non-magnetic material.

18. The power tool of claim 16, wherein the first control technique comprises a pulse width modulated (PWM) control technique used by the controller to control the switching system.

19. The power tool of claim 16, wherein the controller selects a particular phase advance angle for the current component of the drive signals from the look-up table, based on at least one of:

a motor speed of the electronically commutated motor; and a load being experienced by the electronically commutated motor.

20. The power tool of claim 16, wherein the controller operates to perform a real time calculation to determine the phase advance angle to be applied to the current component of the drive signals.

21. The power tool of claim 16, wherein the first control technique is used by the controller after a maximum power output is developed by the electronically commutated motor.

22. The power tool of claim 16, wherein the controller operates to employ the first control technique within a speed range up to a rated speed for the electronically commutated motor, and the field weakening for speeds beyond the rated speed.

* * * * *